(12) United States Patent (10) Patent No.: US 12,130,977 B2
Smith et al. (45) Date of Patent: Oct. 29, 2024

(54) PRESSURE CAPACITIVE REFERENCE FIXED TO A HOUSING

(71) Applicant: Cirque Corporation, Sandy, UT (US)

(72) Inventors: Tyler Smith, American Fork, UT (US); David Taylor, West Jordan, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 18/126,558

(22) Filed: Mar. 27, 2023

(65) Prior Publication Data

US 2024/0329765 A1 Oct. 3, 2024

(51) Int. Cl.
*G06F 3/041* (2006.01)
*G06F 3/044* (2006.01)

(52) U.S. Cl.
CPC ...... *G06F 3/04142* (2019.05); *G06F 3/04166* (2019.05); *G06F 3/0446* (2019.05)

(58) Field of Classification Search
CPC . G06F 3/04142; G06F 3/04166; G06F 3/0446
See application file for complete search history.

(56) References Cited

U.S. PATENT DOCUMENTS

| | | | | | |
|---|---|---|---|---|---|
| 4,798,919 A | * | 1/1989 | Miessler | ................ | G06F 3/045 178/18.05 |
| 5,760,715 A | * | 6/1998 | Senk | ...................... | G06F 3/044 341/26 |
| 6,262,646 B1 | * | 7/2001 | Van Zeeland | ........ | H01H 13/702 200/521 |
| 6,429,846 B2 | * | 8/2002 | Rosenberg | .............. | G06F 3/011 345/173 |
| 6,492,979 B1 | * | 12/2002 | Kent | ...................... | G06F 3/0447 178/18.05 |
| 6,658,271 B1 | * | 12/2003 | Wu | ...................... | H04M 1/0262 345/157 |
| 6,704,005 B2 | * | 3/2004 | Kato | ................... | G06F 3/04883 345/173 |
| 6,822,635 B2 | * | 11/2004 | Shahoian | ................ | G06F 1/169 345/173 |
| 6,943,705 B1 | * | 9/2005 | Bolender | .............. | G06F 3/0445 200/600 |
| 7,215,329 B2 | * | 5/2007 | Yoshikawa | ............. | G06F 3/016 345/173 |
| 7,233,314 B2 | * | 6/2007 | Shih | ....................... | G06F 1/169 312/351.9 |
| 7,242,395 B2 | * | 7/2007 | Kurashima | ........... | G06F 3/0488 345/173 |
| 7,336,260 B2 | * | 2/2008 | Martin | .................. | G09B 21/003 345/169 |
| 7,336,266 B2 | * | 2/2008 | Hayward | ............ | G06F 3/03547 178/18.05 |
| 7,499,040 B2 | * | 3/2009 | Zadesky | ............... | G06F 3/0338 345/173 |
| 7,567,232 B2 | * | 7/2009 | Rosenberg | .............. | G06F 21/32 200/518 |

(Continued)

*Primary Examiner* — Benyam Ketema

(57) ABSTRACT

A capacitance system may include a housing of the electronic device; the housing defining a cavity; a pressure capacitance reference fixed to the housing; a capacitance module disposed deposed within the cavity; a pressure electrode incorporated into the capacitance module where the pressure capacitance reference is detectable with the pressure electrode of the capacitance module.

20 Claims, 15 Drawing Sheets

(56) References Cited

U.S. PATENT DOCUMENTS

| | | | | |
|---|---|---|---|---|
| 7,710,402 B2* | 5/2010 | Takenaka | | G06F 3/04142 |
| | | | | 382/121 |
| 7,834,855 B2* | 11/2010 | Hotelling | | G06F 3/04883 |
| | | | | 345/169 |
| 7,834,857 B2* | 11/2010 | Prados | | B60K 35/00 |
| | | | | 345/173 |
| 8,081,425 B2* | 12/2011 | Chen | | H05K 1/16 |
| | | | | 361/679.01 |
| 8,209,861 B2* | 7/2012 | Long | | G06F 3/0446 |
| | | | | 29/829 |
| 8,384,679 B2* | 2/2013 | Paleczny | | G06F 3/016 |
| | | | | 345/173 |
| 8,384,680 B2* | 2/2013 | Paleczny | | G06F 3/016 |
| | | | | 345/173 |
| 8,445,793 B2* | 5/2013 | Westerman | | G06F 3/041 |
| | | | | 178/18.02 |
| 8,488,308 B2* | 7/2013 | Ng | | G06F 3/0414 |
| | | | | 345/173 |
| 8,624,837 B1* | 1/2014 | Han | | G06F 1/1615 |
| | | | | 345/157 |
| 8,633,916 B2* | 1/2014 | Bernstein | | G06F 1/1662 |
| | | | | 345/174 |
| 8,739,033 B2* | 5/2014 | Rosenberg | | G06F 21/32 |
| | | | | 715/702 |
| 8,760,413 B2* | 6/2014 | Peterson | | G06F 3/016 |
| | | | | 341/23 |
| 9,001,045 B2* | 4/2015 | Laitinen | | H10N 30/101 |
| | | | | 345/173 |
| 9,041,663 B2* | 5/2015 | Westerman | | G06F 3/04883 |
| | | | | 345/173 |
| 9,143,870 B2* | 9/2015 | Liu | | H04R 19/04 |
| 9,146,642 B2* | 9/2015 | Yamano | | G06F 3/03545 |
| 9,285,929 B2* | 3/2016 | Zhang | | G06F 3/043 |
| 9,857,928 B2* | 1/2018 | Kemppinen | | G06F 3/041 |
| 10,409,391 B2* | 9/2019 | Silvanto | | G06F 3/0231 |
| 10,627,935 B2* | 4/2020 | Ding | | G02F 1/13338 |
| 10,664,073 B2* | 5/2020 | Bauer | | G06F 3/0383 |
| 11,379,052 B2* | 7/2022 | Wakuda | | H03K 17/964 |
| 11,385,718 B2* | 7/2022 | Glad | | G06F 3/041 |
| 11,644,926 B2* | 5/2023 | Taylor | | G06F 3/04186 |
| | | | | 345/173 |
| 2002/0144886 A1* | 10/2002 | Engelmann | | H03K 17/96 |
| | | | | 200/600 |
| 2004/0201577 A1* | 10/2004 | Yamada | | G06F 3/044 |
| | | | | 345/173 |
| 2005/0179646 A1* | 8/2005 | Lin | | G06F 3/0416 |
| | | | | 345/156 |
| 2009/0140979 A1* | 6/2009 | Imamura | | G06F 1/1616 |
| | | | | 345/158 |
| 2010/0156824 A1* | 6/2010 | Paleczny | | G06F 3/016 |
| | | | | 345/173 |
| 2011/0057904 A1* | 3/2011 | Yamano | | H01G 5/16 |
| | | | | 345/174 |
| 2011/0141052 A1* | 6/2011 | Bernstein | | G06F 3/041 |
| | | | | 341/5 |
| 2011/0148608 A1* | 6/2011 | Grant | | G06F 1/1626 |
| | | | | 345/173 |
| 2012/0092285 A1* | 4/2012 | Osborn | | G06F 3/0445 |
| | | | | 345/174 |
| 2014/0002113 A1* | 1/2014 | Schediwy | | G06F 3/0446 |
| | | | | 324/661 |
| 2014/0092064 A1* | 4/2014 | Bernstein | | G06F 3/041 |
| | | | | 345/174 |
| 2014/0368454 A1* | 12/2014 | Morita | | G06F 3/0418 |
| | | | | 345/173 |
| 2015/0243457 A1* | 8/2015 | Niu | | H01H 13/46 |
| | | | | 156/247 |
| 2018/0129287 A1* | 5/2018 | Bernstein | | G06F 1/1662 |

* cited by examiner

PRESSURE CAPACITIVE REFERENCE FIXED TO A HOUSING

FIELD OF THE DISCLOSURE

This disclosure relates generally to systems and methods for measuring a pressure input. In particular, this disclosure relates to systems and methods for measuring a pressure input on a touch surface of an electronic device.

BACKGROUND

A touch pad is often incorporated into laptops and other devices to provide a mechanism for giving inputs to the device. The touch pads may operate using pressure sensing, which may directly manipulate objects depicted in the screen. Pressure sensors may detect pressure from on the touch screen intended by the user to be control inputs.

An example of a pressure sensor is disclosed in U.S. Patent Publication No. 2014/0368454 issued to Regis Croisonnier, et al. This reference discloses a control method for a function of a touchpad utilizing a capture device includes measuring an analog threshold pressure value, and differentials thereof, and delivering event signals based upon the threshold pressure values and differentials thereof to execute a selected function. The capture device for remote, virtual on-screen data input by hand annotation includes at least three functional layers including a bottom rigid layer, a middle pressure sensor layer, a capacitive flexible sensor layer, and a top flexible panel layer. The bottom rigid layer has a surface that provides a mechanical support for writing. The middle pressure sensor layer is adapted to measuring a pressure array or map on the capture active area and to send data representing the measured pressure to a personal computer. The top flexible touch-sensitive passive LCD display layer includes an LCD surface by which whatever is written down on the LCD is impressed graphically due to its liquid crystal physical properties wherein applied pressure changes the crystal particles orientation and light properties, such that when a stylus presses against a writing surface thereof, it leaves a visible trace allowing the user to produce a drawing though no real ink has flown.

This reference is herein incorporated by reference for all that it discloses.

SUMMARY

In one embodiment, a device may include a capacitance system; a housing of the electronic device; the housing defining a cavity; a pressure capacitance reference fixed to the housing; a capacitance module deposed within the cavity; at least one touch electrode on a substrate of the capacitance module; a substrate pressure electrode also on the substrate of the capacitance module where the pressure capacitance reference is detectable with the pressure electrode of the capacitance module.

The substrate pressure electrode may be a part of a dedicated pressure sensing circuit.

The pressure capacitance reference may include at least one reference pressure electrode.

The reference pressure electrode of the pressure capacitance reference may be a transmit electrode and the substrate pressure electrode on the substrate is a sense electrode.

The reference pressure electrode of the pressure capacitance reference may be a sense electrode and the substrate pressure electrode on the substrate is a transmit electrode.

The reference capacitance electrode of the pressure capacitance reference may be disposed within a thickness of the housing.

The substrate pressure electrode on the substrate may be a self-capacitance electrode.

The pressure capacitance reference may include an electrical property of a material of the housing.

The substrate pressure electrode on the substrate may be located in a corner of the substrate.

The substrate pressure electrode may be part of a group of substrate pressure electrodes, the substrate has a plurality of corners and at least one of the electrodes from the group of electrodes is located in each of the corners of the substrate.

The substrate pressure electrode on the substrate may be aligned with the pressure capacitance reference.

The pressure may be determined, at least in part, by the difference between the capacitance measured between the substrate pressure electrode and the pressure capacitance reference.

The substrate pressure electrode on the substrate may be not aligned with the pressure capacitance reference.

The substrate pressure electrode may be selectively part of a touch sensor circuit and at least one touch electrode is selectively part of a pressure sensor circuit.

The substrate pressure electrode on the substrate may be displaceable with respect to the pressure capacitance reference when a pressure is applied to the capacitance module. An overlay may cover the capacitance module.

In one embodiment, a method for detecting a pressure input may include measuring a first capacitance between a substrate pressure electrode on a substrate and a pressure capacitance reference fixed to a housing, detecting a change in measured corresponding to an object applying a pressure input to a capacitance module, which displaces the substrate and substrate pressure electrode, measuring a second capacitance between the substrate pressure electrode and the pressure capacitance reference and determining an amount of the pressure input, where the determined amount of the pressure input is determined by the difference between the first and second measured capacitance between the substrate pressure electrode and the pressure capacitance reference.

The substrate pressure electrode may be part of a group of substrate pressure electrodes on the substrate, each substrate pressure electrode is located in different parts of the substrate, and the location of a pressure input is determined, at least in part, by the difference between the capacitance measured between the pressure capacitance reference and each of the group of substrate pressure electrodes.

Detecting a pressure input may trigger a haptic response.

A capacitance system integrated into an electronic device may include a housing of the electronic device; the housing defining a cavity; a capacitance module deposed within the cavity; a pressure electrode incorporated into the capacitance module where the housing may be detectable with the pressure electrode of the capacitance module; memory and a processor in communication with the memory; and the memory containing programed instructions that, when executed, causes the processor to, with the pressure electrode, measure a distance between the housing and the pressure electrode and detect a pressure input based, at least in part, on the measured distance.

Figure 1:
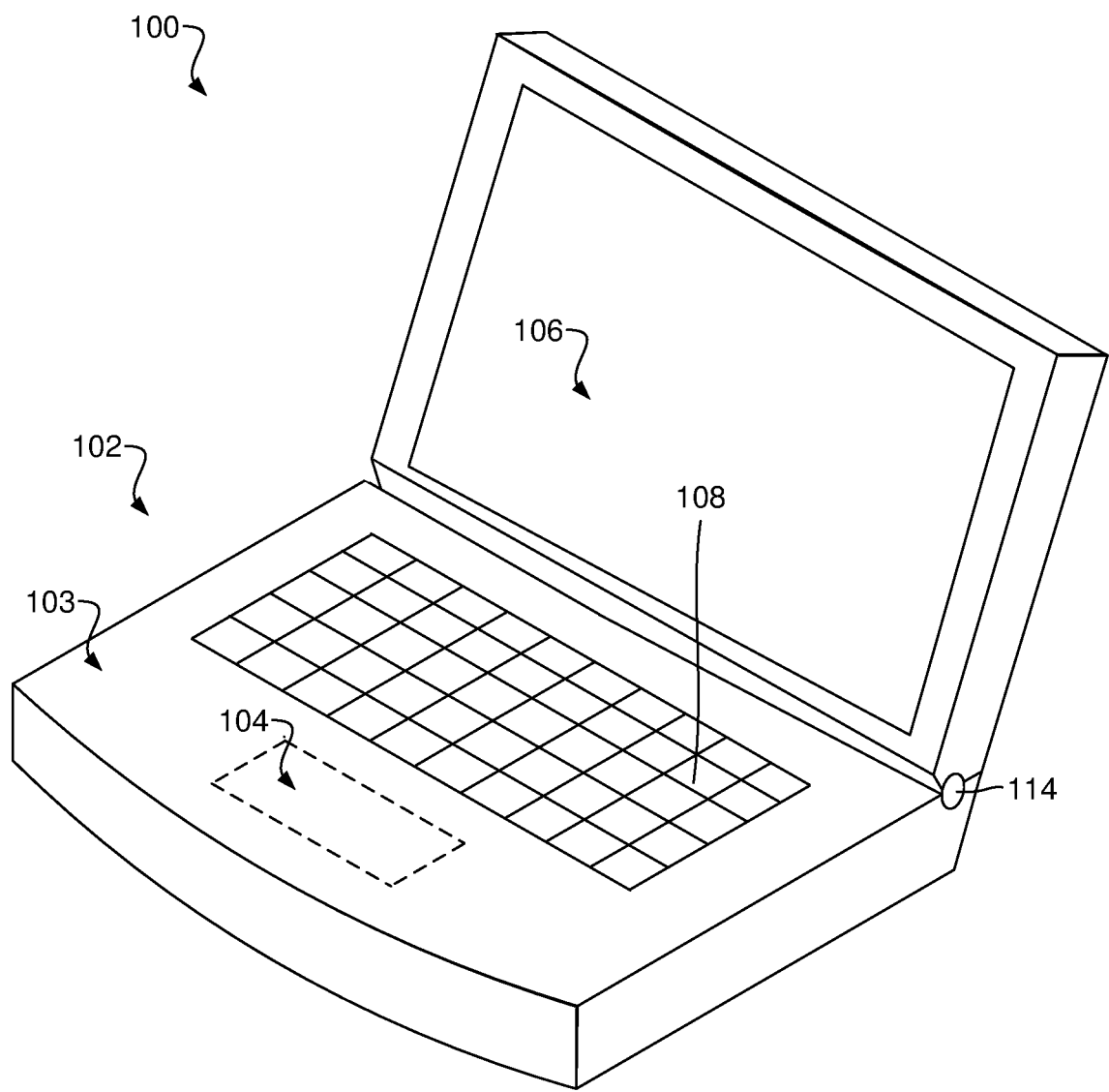
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "pressure input" may generally refer to a force applied to a surface by an object pressing on the surface at a certain measurable location with a certain measurable magnitude. In some cases, the object may be a finger, a stylus, a palm of a hand or any other object capable of pressing against a surface. In some examples, the location of the pressure input may be a point, a series of points or an area corresponding to the area of the object. For example, a finger may press on a surface of a capacitance module at a certain location and a certain magnitude that may be measured by a pressure sensor. In some examples, multiple magnitudes at multiple locations may be measured as a single pressure input. In other examples, a pressure input may be one magnitude at one location.

For the purposes of this disclosure, a "pressure capacitance reference" may generally refer to an object that is electrically conductive which may form one half of a capacitance coupled pair. In some examples, a pressure capacitance reference may be an electrode specifically constructed to be part of a capacitance sensor with other electrodes. In other examples, a pressure capacitance reference may be any surface, object or material in which an electrode driven at a voltage may measure a capacitance.

For the purposes of this disclosure, a "pressure sensor" may generally refer to a device with at least one pressure electrode on a substrate that may detect a pressure input by detecting a change in the capacitance of at least one pressure electrode. In some examples, a pressure sensor may include one pressure electrode on a substrate and one pressure electrode not on the substrate. In some examples, a pressure sensor may include multiple pressure electrodes on a substrate. In some examples, a pressure sensor may include multiple pressure sensors not on a substrate. In some examples, a pressure sensor may include at least one sense electrode and at least one transmit electrode. In other examples, a pressure sensor may include at least one self-capacitance electrode.

For the purposes of this disclosure, a "pressure sensing circuit" may generally refer to an electrically connected system that may detect and measure the magnitude and/or location of a pressure input. In some examples, a pressure sensing circuit may include at least one pressure sensor, connecting traces and a pressure controller. In some examples, a pressure sensing circuit may include multiple sensors that communicate independently with the pressure controller. In some examples, a pressure sensing circuit may share components with a touch sensing circuit. In some examples, a pressure controller may include components that may include memory, programmed instructions and a processor.

For the purposes of this disclosure, a "touch sensing circuit" may generally refer to an electrically connected system that may detect and measure the location of a capacitive object moving near a capacitance module. In some examples, a touch sensing circuit may include at least one touch sensor, connecting traces and a touch controller. In some examples, a touch sensing circuit may include multiple sensors that communicate independently with the touch controller. In some examples, a touch sensing circuit may share components with a pressure sensing circuit. In some examples, a touch controller may include components that may include memory, programmed instructions and a processor.

For the purposes of this disclosure, a "touch electrode" may generally refer to an electrode that is part of the touch sensing circuit. Such an electrode may be used to determine a location of a user input by measuring changes in capacitance. A touch electrode may include transmit electrodes and sense electrodes that are part of the touch sensing circuit. In some examples, the distances between the transmit electrodes and the sense electrodes of the touch sensing circuit may be fixed with respect to each other. In such an example, when a pressure is applied to the touch surface in such a way that is pushes onto the capacitance module, the sense electrodes and the transmit electrodes of the touch sensing circuit may move together at relatively the same distance with respect to each other.

For the purposes of this disclosure, a "substrate pressure electrode" may generally refer to an electrode that is on the substrate and is part of the pressure sensing circuit. In some examples, the substrate pressure electrode may be on the same surface as at least some of the touch electrodes. In some cases, the touch electrodes and the substrate pressure electrode are part of different circuits. In other examples, the substrate pressure electrode may be selectively part of the touch sensing circuit and/or the pressure sensing circuit. The substrate pressure sensing circuit may be a transmit electrode, a sense electrode, a self-capacitance electrode, a mutual capacitance electrode, or combinations thereof. In some cases, the substrate pressure electrode may be part of a self-capacitance circuit when the substrate pressure electrode transmits a signal and may also measure a change in capacitance based on the transmitted signal. The substrate pressure electrode may be configured to move with respect to the pressure capacitance reference. For example, when a pressure is applied that causes the capacitance module to move inward into the cavity, the distance between the substrate pressure electrode and the pressure capacitance reference may increase thereby changing capacitance measurements between them.

For the purposes of this disclosure, a "reference pressure electrode" may generally refer to an electrode that is fixed to the housing. In some cases, the reference pressure electrode is deposited onto a surface of the housing. In other examples, the reference pressure electrode may be attached to a surface that is attached to the housing or an intermediate object attached to the housing. In examples with a reference pressure electrode, the reference pressure electrode may be part of the pressure sensing circuit. The reference pressure electrode may be a sense electrode, a transmit electrode, a self-capacitance electrode, a mutual capacitance electrode, or combinations thereof. The reference pressure electrode may be configured to move with respect to the substrate pressure capacitance. For example, when a pressure is applied that causes the capacitance module to move inward into the cavity, the distance between the substrate pressure electrode and the reference pressure electrode may increase thereby changing capacitance measurements between them.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
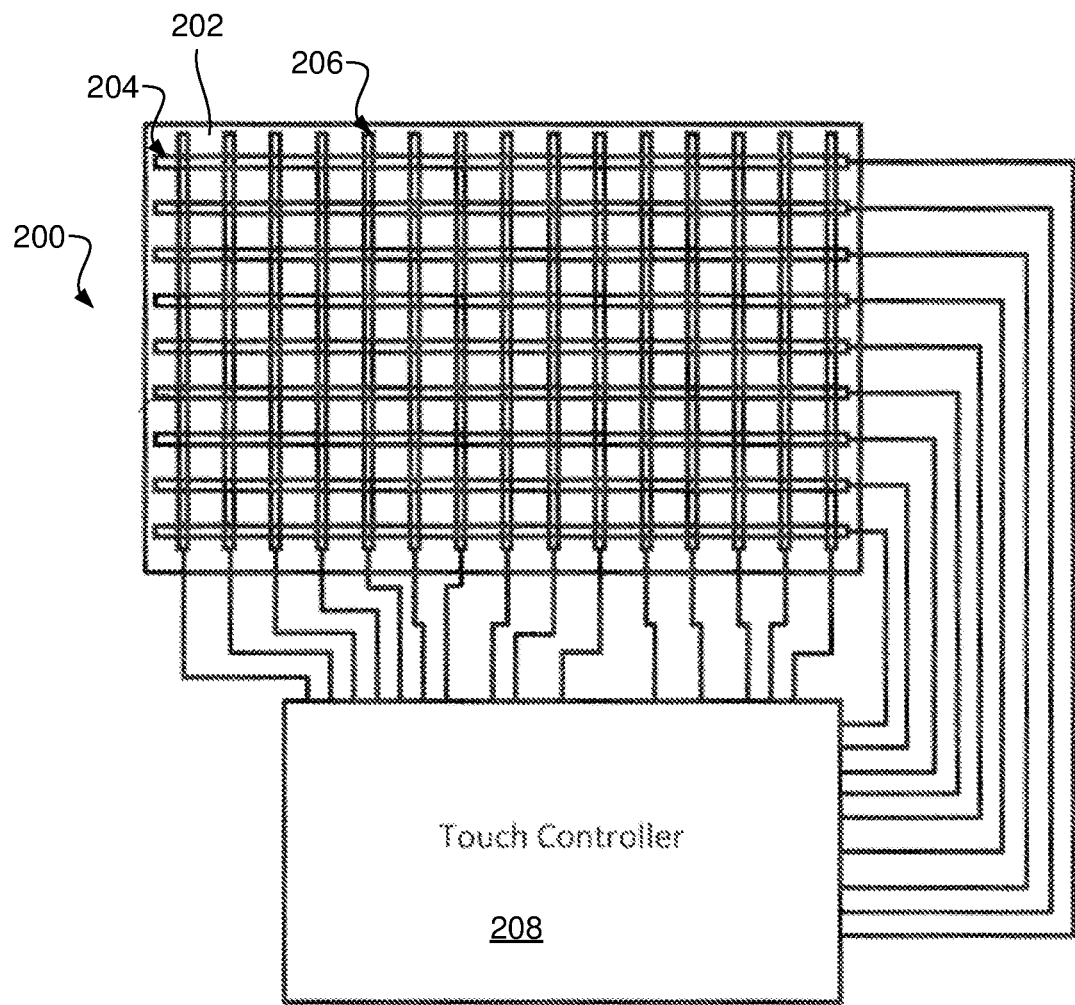
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
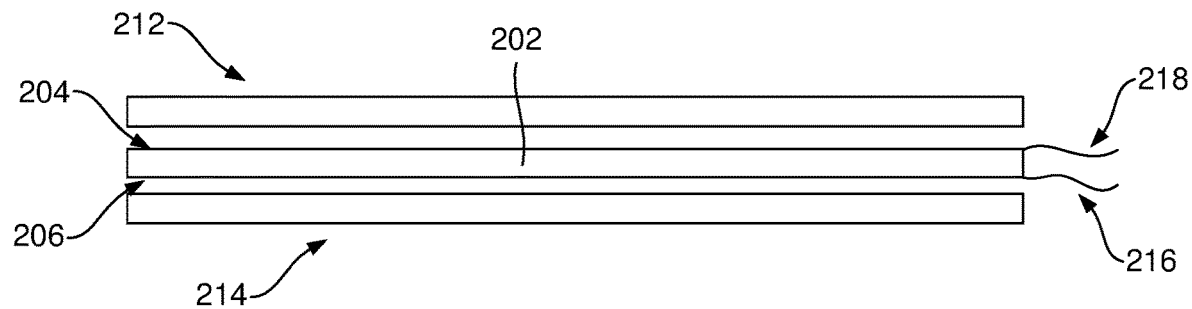
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
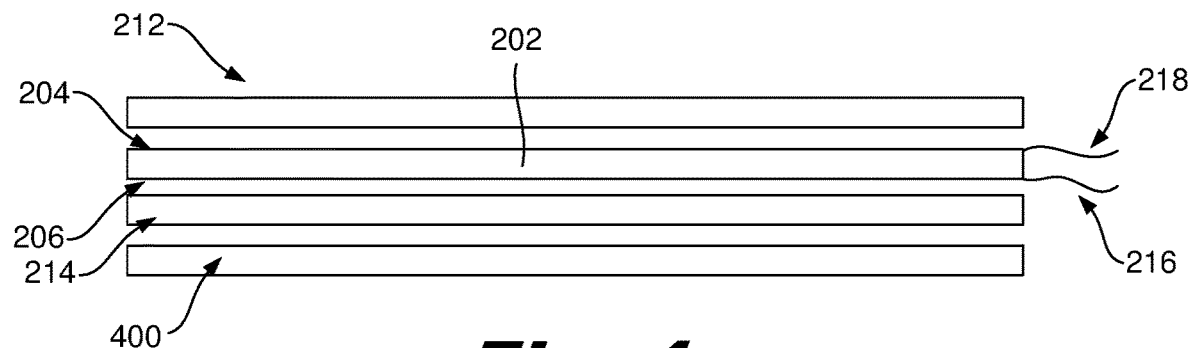
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filament's display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
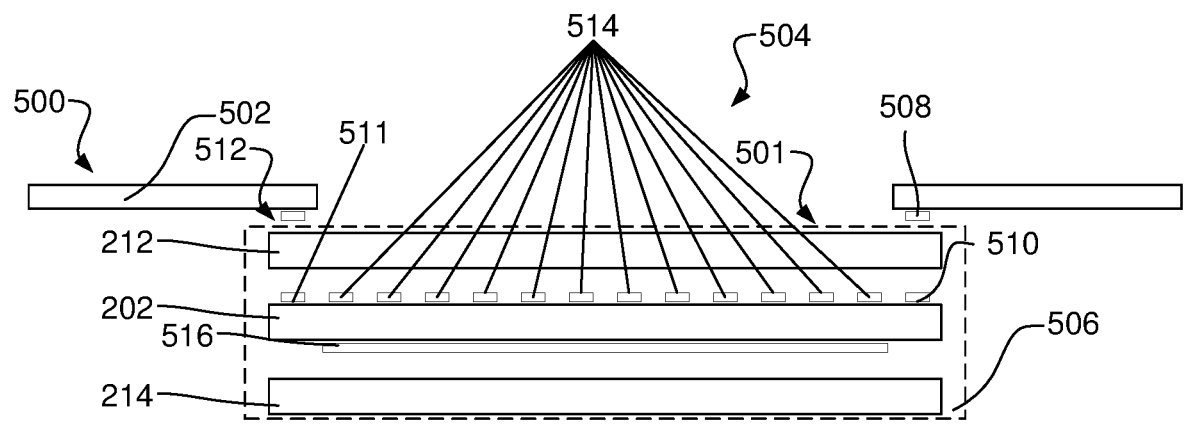
FIG. 5 depicts an example of a capacitance system in accordance with the disclosure.

FIG. 5 depicts an example of a cross section of a capacitance system 500. A housing 502 includes a first side which may be a working surface and a second side which may be an interior surface. An opening 504 of the housing 502 may allow access to a cavity 506. A capacitance module 501 is disposed within the cavity 506. A substrate 202 of the capacitance module 501 may be located between a capacitance reference surface 212 and a shield 214. The substrate 202 has a first side with a set of touch electrodes 514 and a second side with a set of touch electrodes 516. A substrate pressure electrode 510 resides on the first side of the substrate 202. In the example of FIG. 5, a first substrate pressure electrode 510 is located on a first end of the substrate 202, and a second substrate pressure electrode 511 is located on a second end of the substrate 202. In some examples, the touch electrodes 514 are located between the first substrate pressure electrode 510 and the second substrate pressure electrode 511. A reference pressure electrode 508 resides on the interior surface of the housing 502 on each side of the opening 504.

The reference pressure electrode 508 and the substrate pressure electrode 510 form a portion of a pressure sensor 512 which may be used to determine when a pressure is applied to the capacitance module and/or the working surface of the housing. In some examples, the pressure sensor may also determine a magnitude of the pressure input, an amount of the pressure input, location of the pressure input, another characteristic of a pressure input, or combinations thereof. In the example depicted in FIG. 6, the capacitance module 501 is displaceable within the cavity 506. The displacement of the capacitance module 501 may cause the capacitance measured in the pressure sensor 512 to change as the substrate pressure electrode 510 moves away from the reference pressure electrode 508. This may happen in response to a pressure input from an object (not shown). In this case, the pressure input from an object may cause the capacitance reference surface 212 to be moved downward within the cavity 506. In some examples, the capacitance reference surface 212 is next to the substrate 202 before the pressure input occurs. In other examples, an air gap exists between the layers of the capacitance module 501. In either case, the pressure input on the capacitance reference surface 212 may cause the capacitance reference surface 212 to move downward and displace the substrate 202. The displacement of the substrate 202 may cause the substrate pressure electrode 510 to be displaced downward with the substrate. In this example, the change in the location of the substrate pressure electrode 510 may be detected by the pressure sensor 512. The measured change in capacitance by the pressure sensor 512 may be determined by the change in distance between the reference pressure electrode 508 and the substrate pressure electrode 510.

In some examples, the substrate pressure electrode 510 may be a transmit electrode. In such an example, the substrate pressure electrode 510 may be driven at a certain voltage by a controller of the pressure sensor 512. The reference pressure electrode 508, in this example, may be a sense electrode and may be connected to the controller of the pressure sensor 512. As the substrate pressure electrode 510 is driven at a certain voltage, the pressure sensor 512 may determine the distance between the reference pressure electrode 508 and the substrate pressure electrode 510. This distance may be determined, at least in part, by the capacitance measured between the two electrodes of the pressure sensor 512. In this example, a pressure input applied to the capacitance module 501 may displace the substrate pressure electrode 510. This may cause a change in the distance between the two electrodes of the pressure sensor 512 measured by the change in the capacitance between the two electrodes. The controller of the pressure sensor 512 may determine the change in capacitance related to the change in distance between the electrodes and thereby determine the magnitude of the pressure input applied to the capacitance module 501. In other examples, the substrate pressure electrode 510 may be a sense electrode and the reference pressure electrode 508 may be a transmit electrode.

In the depicted example, the capacitance system 500 has a pressure sensor on each side of the set of touch electrodes 514. In some examples, the location and magnitude of a pressure input may be determined based on the difference between the capacitances of the two sensors. A pressure input applied at a location on the capacitance reference surface 212 may displace the capacitance reference surface. At the location on the capacitance reference surface 212 where the pressure input is applied, the capacitance reference surface may be displaced a first distance. At a second location on the capacitance reference surface 212 where the pressure input is not applied, the capacitance reference surface may be displaced a second distance. The capacitance reference surface 212 may then move downward and apply a force to the substrate 202. This applied force may be different at different locations on the substrate 202 depending on the location of the pressure input applied to the capacitance reference surface 212. In this way, the substrate 202 may be displaced different distances at different locations. The pressure sensors on each side of the set of touch electrodes may therefore be displaced different distances. By measuring the changes in capacitances of the pressure sensors, the magnitude and location of the pressure input may be determined.

In some cases, a location of a pressure input may be determined, in part, by comparing the measured capacitances of the pressure sensors. For example, in examples where the first pressure sensor measures a greater change in capacitance than the second pressure sensor, the system may determine that the pressure input was made at a location closer to the first pressure sensor. Specific measurements of each pressure sensor may be used to determine the exact location of the pressure input.

In some examples, the touch electrodes are used to determine the location of a proximity input, a touch input, and/or a pressure input. The pressure sensors may be used as a redundant detection method for determining the location of the pressure input. In other examples, the touch electrodes may be used primarily for detecting the location of an input, and the pressure sensors may be used to determine the amount of pressure applied. In some examples, the touch electrodes and the pressure sensors both provide inputs to determine the location of a user input. In some cases, a haptic actuator may be triggered in response to measuring a pressure of a user input, measuring an absolute displacement of a user input, measuring a relative displacement of a user input, or combinations thereof.

In some examples, the capacitance system 500 may contain more than two pressure sensors. In some examples, the capacitance system 500 may have only one pressure sensor. In some examples, a set of pressure sensors may be positioned near the edges of the set of touch electrodes 514.

Figure 6:
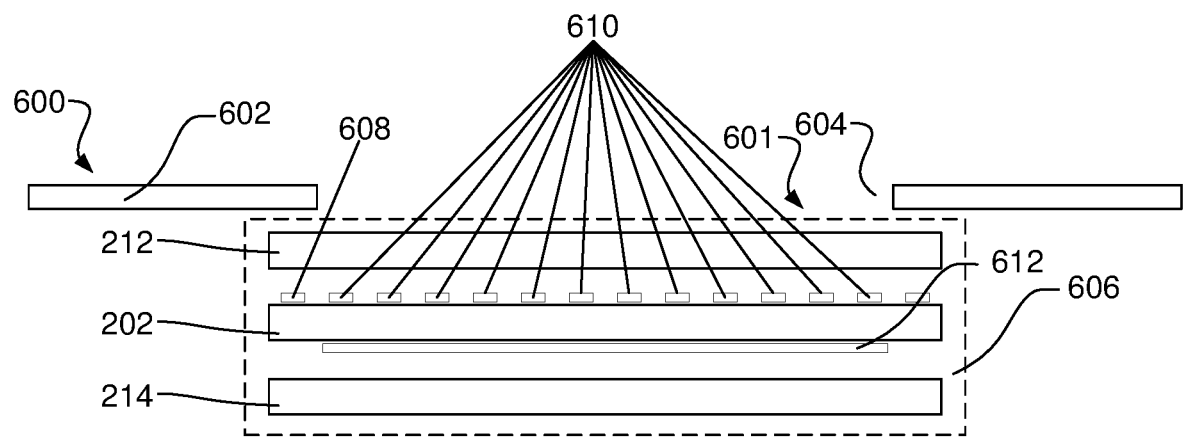
FIG. 6 depicts an example of a capacitance system in accordance with the disclosure.

FIG. 6 depicts an example of a cross section of a capacitance system 600. A housing 602 includes a first side which may be a working surface and a second side which may be an interior surface. An opening 604 of the housing 602 allows access to a cavity 606. A capacitance module 601 is disposed within the cavity 606. A substrate 202 of the capacitance module 601 may be located between a capacitance reference surface 212 and a shield 214. The substrate 202 has a first surface with a set of touch electrodes 610 and a second surface with a set of touch electrodes 612. A substrate pressure electrode 608 resides on the first surface of the substrate 202 on each end of the substrate 202.

In this example, the substrate pressure electrode 608 is part of a pressure sensing circuit. The housing 602 may be electrically conductive and detectable with the substrate pressure electrode 608. In this example, the capacitance module 601 is displaceable within the cavity 606. The substrate pressure electrode 608 may detect a capacitance based, at least in part, on the distance between the substrate pressure electrode 608 and the housing 602. A pressure input on the capacitance reference surface 212 may cause the substrate 202 to be displaced downward in the cavity 606. This displacement may cause the distance between the housing 602 and the substrate pressure electrode 608. The change in distance may be measured by the change in capacitance measured with the substrate pressure electrode 608.

In some examples, the substrate pressure electrode may transmit a signal, and then measure the change in capacitance resulting from the transmitted signal. In those examples, the where the distance between the capacitance reference surface is farther away from substrate pressure electrode, the change in capacitance may be greater.

The reference capacitance surface may be formed based on the electrically characteristics of the housing. For example, in those examples where the housing is made of an electrically conductive material, the electrical properties of the electrically conductive material may be detected with the substrate pressure electrode. In other examples, the reference capacitance surface may be formed, at least in part, by an electrode deposited on the housing, a coating on the housing, an object attached to the housing, another feature of the housing, or combinations thereof.

Figure 7:
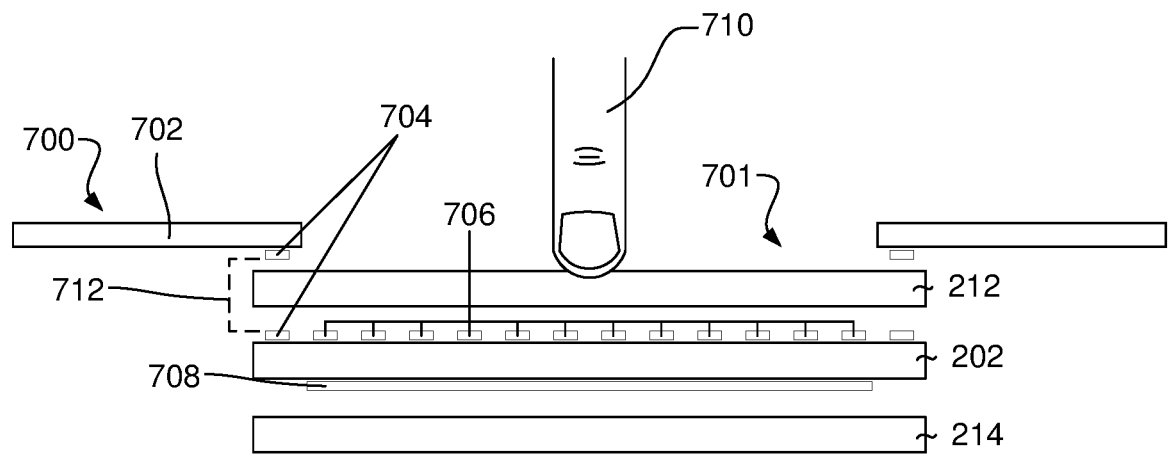
FIG. 7 depicts an example of measuring a pressure input in accordance with the disclosure.
Figure 7:
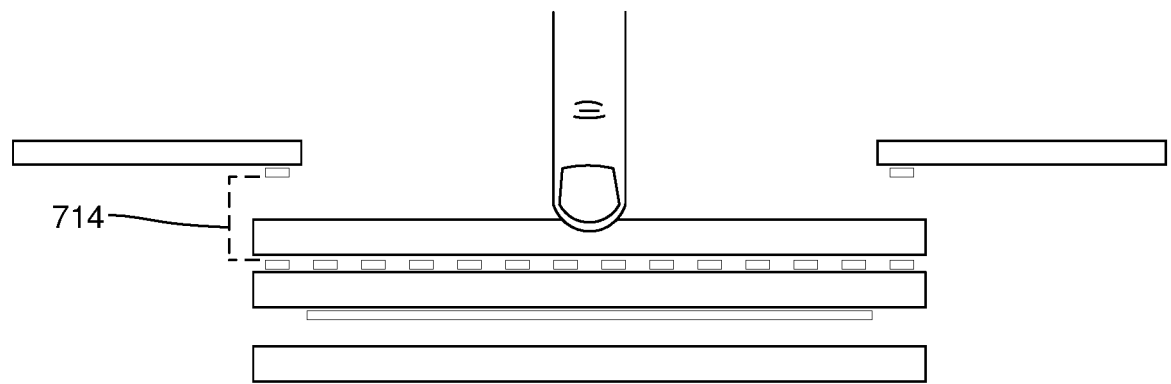

FIG. 7 depicts an example of a capacitance system 700. The substrate 202 has a first side with a set of touch electrodes 706 and a second side with a set of touch electrodes 708. A pressure sensor 704 has a substrate pressure electrode on the substrate 202 and a reference pressure electrode on the second side of the housing 702. The two electrodes of the pressure sensor 704 are separated by a first distance 712. In this example, the object 710 is a finger that is applying a pressure input on the capacitance reference surface 212. The pressure input causes portions of the capacitance module 701 to move downward, which may cause the electrodes of the pressure sensor 704 to separate to a second distance 714.

The first distance 712 may correspond to a first capacitance measured with the pressure sensor 704 and the second distance 714 may correspond to a second capacitance measured with the pressure sensor 704. In this example, the first capacitance may be an initial capacitance and the second capacitance may be an adjusted capacitance. The difference between the initial capacitance and the adjusted capacitance may be used to determine the magnitude of the pressure input applied with the finger 710.

Figure 8:
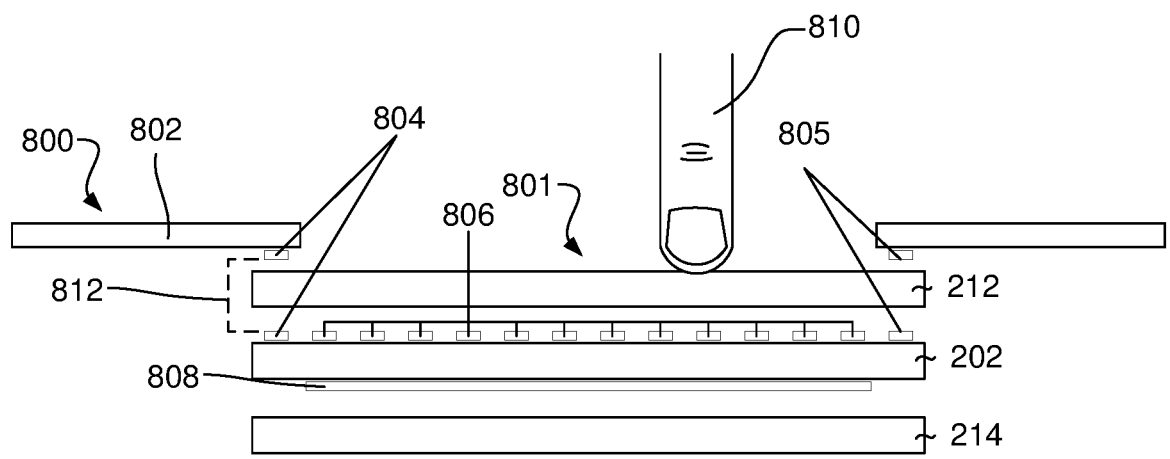
FIG. 8 depicts an example of measuring a pressure input in accordance with the disclosure.
Figure 8:
Figure 8:
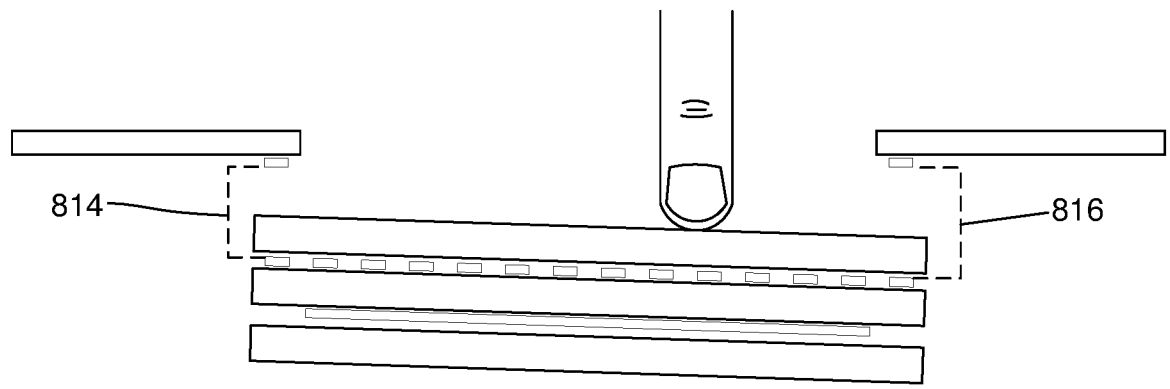

FIG. 8 depicts an example of a capacitance system 800. A first pressure sensor 804 has a substrate pressure electrode on the substrate 202 and a reference pressure electrode on the second side of the housing 802 on one side of the set of touch electrodes 806. A second pressure sensor 805 is positioned on the other side of the set of touch electrodes 806. The two electrodes of the first pressure sensor 804 are separated by a first distance 812, and the two electrodes of the second pressure sensor 805 are separated by a second distance. In this example, the object 810 is a finger that applies a pressure input on the capacitance reference surface 212. The pressure input causes at least a portion of the capacitance module 801 to move downward, which may cause the two electrodes of the first pressure sensor 804 to be separated by a second distance 814 and the two electrodes of the second pressure sensor 805 to be separated by a third distance 816.

The first distance 812 may correspond to a first capacitance measured with the pressure sensors 804 and 805. The second distance 814 may correspond to a second capacitance measured with the pressure sensor 804 and the third distance may correspond to a third capacitance measured with the pressure sensor 805. In this example, the first capacitance may be an initial capacitance and the second and third capacitances may be adjusted capacitances. The difference between the initial capacitance and the adjusted capacitances may be used to determine the magnitude and/or location of the pressure input applied with the finger 810.

Figure 9:
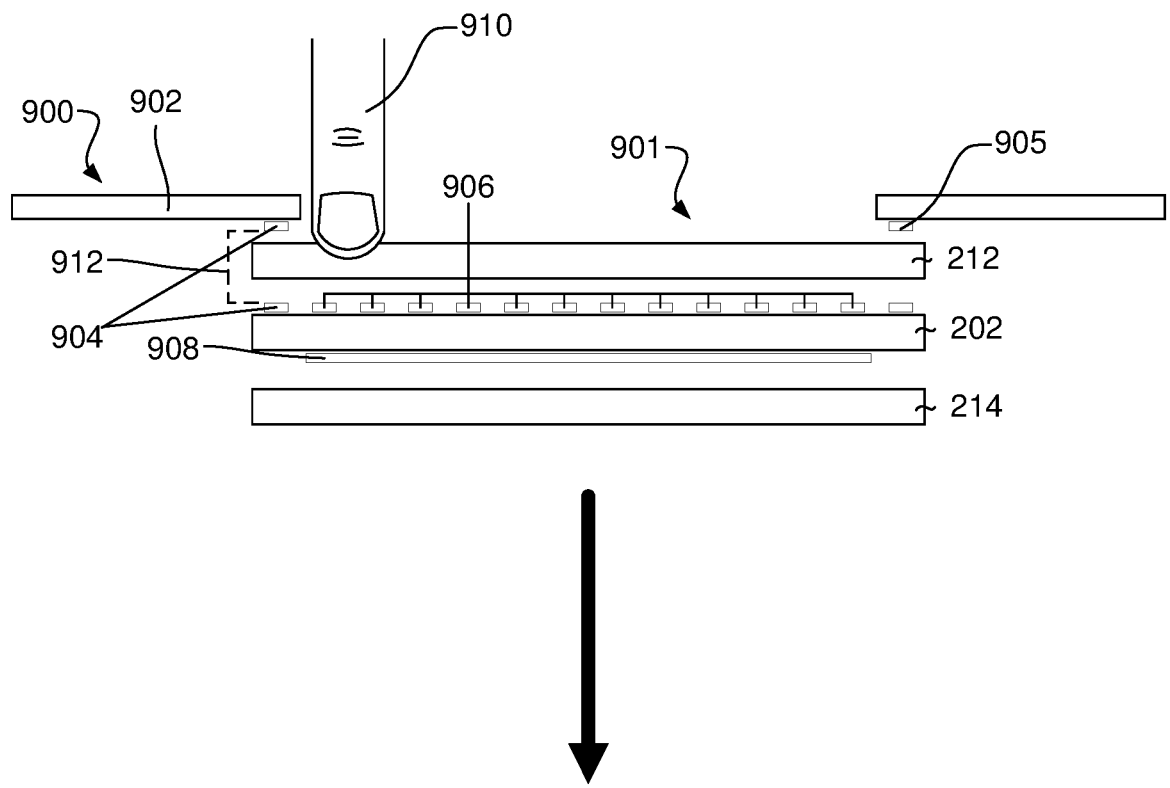
FIG. 9 depicts an example of measuring a pressure input in accordance with the disclosure.
Figure 9:
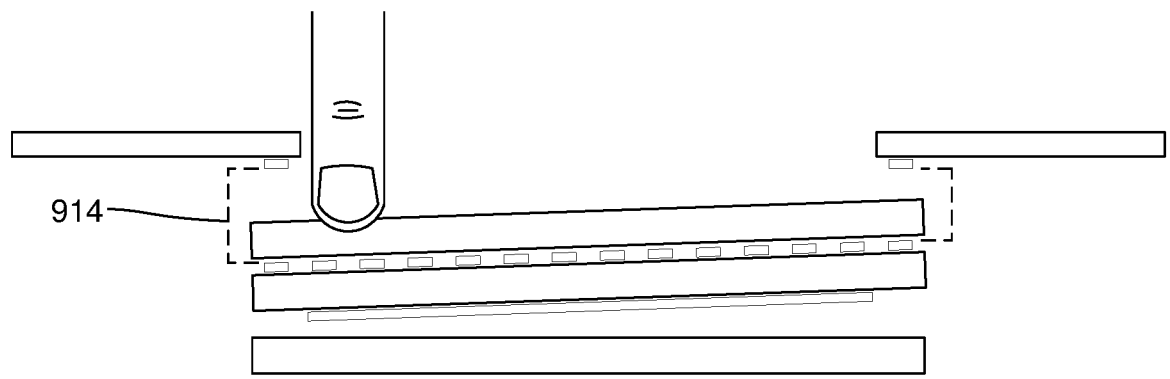

FIG. 9 depicts an example of a capacitance system 900. A first pressure sensor 904 has a substrate pressure electrode on the substrate 202 and a reference pressure electrode on the second side of the housing 902 on one side of the set of touch electrodes 906. A second pressure sensor 905 is positioned on the other side of the set of touch electrodes 906. The two electrodes of the first pressure sensor 904 are separated by a first distance 912 as are the two electrodes of the second pressure sensor 905. In this example, the object 910 is a finger that applies a pressure input on the capacitance reference surface 212. The pressure input causes portions of the capacitance module 901 to move downward, which may cause the two electrodes of the first pressure sensor 904 to be separated by a second distance 814, however the two electrodes of the second pressure sensor 905 are still separated by the first distance 812.

The first distance 912 may correspond to a first capacitance measured with the pressure sensors 904 and 905. The second distance may correspond to a second capacitance measured with the pressure sensor 904. In this example, the first capacitance may be an initial capacitance and the second capacitance may be an adjusted capacitance. The difference between the initial capacitance and the adjusted capacitance may be used to determine the magnitude and location of the pressure input applied with the finger 910.

Figure 10:
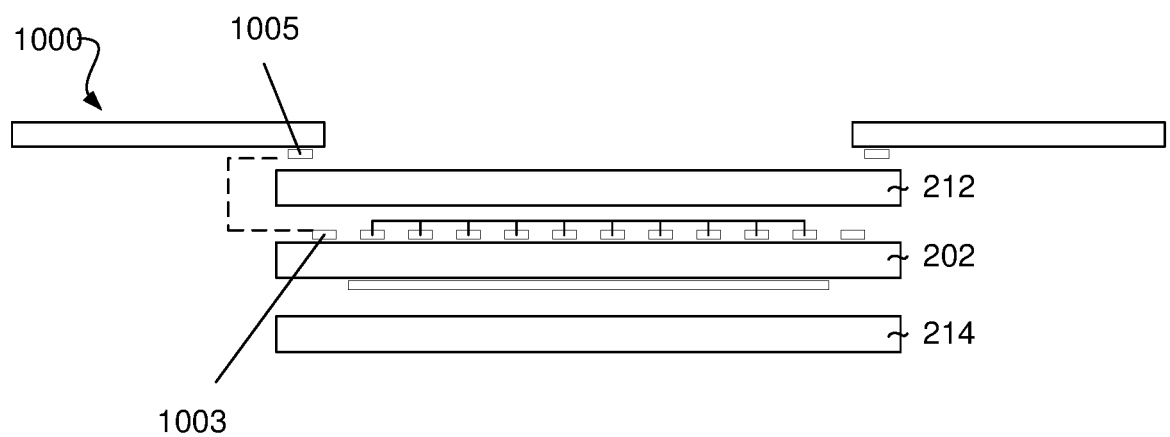
FIG. 10 depicts an example of a nonaligned pressure sensor in accordance with the disclosure.

FIG. 10 depicts an example of a capacitance system 1000. In this example, the substrate pressure electrode 1003 and the reference pressure electrode 1005 are not aligned on the vertical axis, but the capacitance between the two electrodes is still measurable and determined, at least in part, by the distance between the two electrodes. In some examples, the two electrodes 1003 and 1005 are aligned on the vertical axis.

Figure 11:
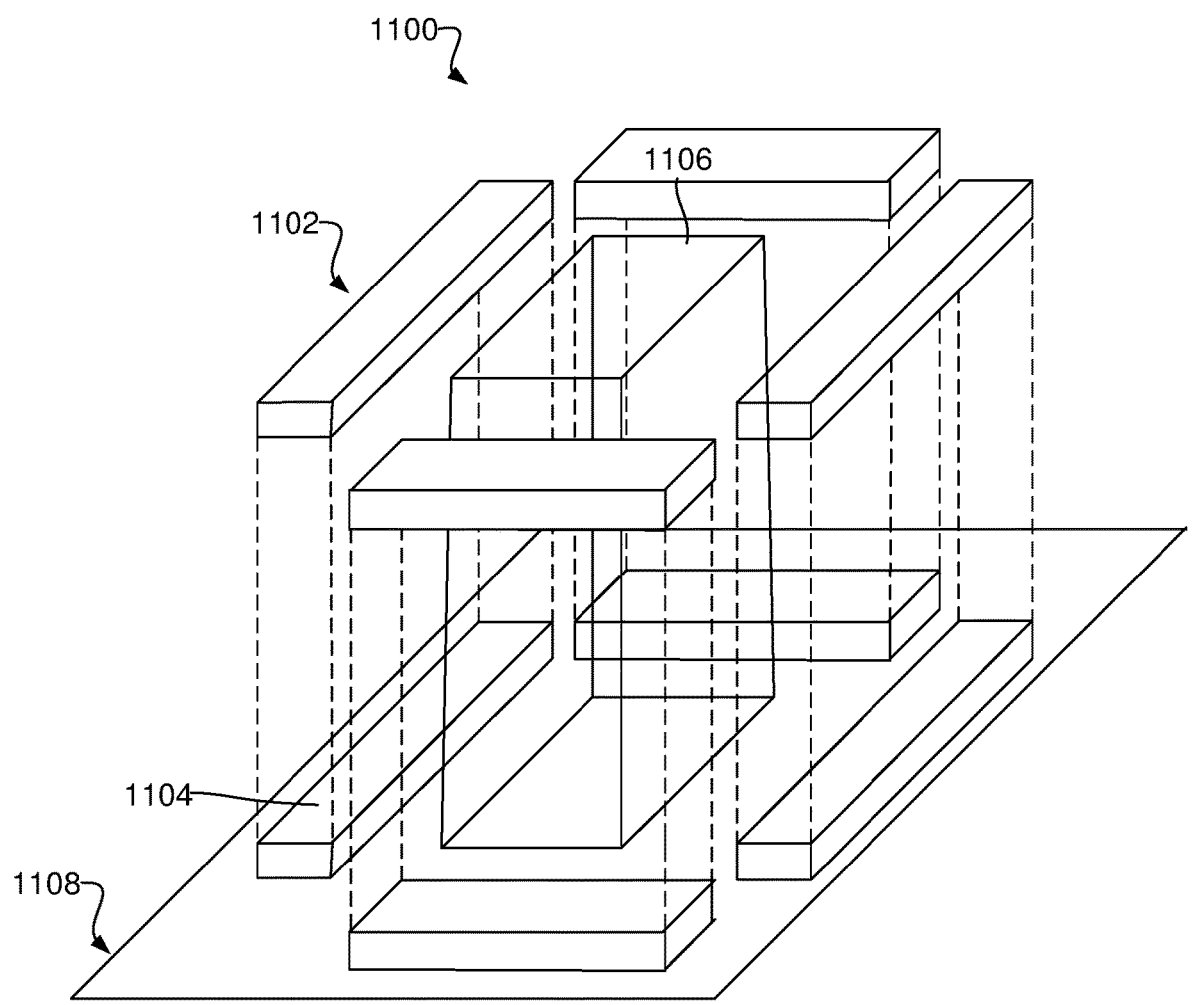
FIG. 11 depicts an example of a capacitance system in accordance with the disclosure.

FIG. 11 depicts an example of a capacitance system 1100. A capacitance module 1106 is fixed to a substrate 1108. A substrate pressure electrode 1104 is also fixed to the substrate 1108 adjacent to a side of the capacitance module 1106. Other substrate pressure electrodes are fixed to the substrate 1108 adjacent to other sides of the capacitance module 1106. A reference pressure electrode 1102 is fixed to a housing (not shown) and is positioned above and aligned with the substrate pressure electrode 1104. In this example, the reference substrate electrode 1102 is not fixed to the substrate 1108. Similar reference substrate electrodes are fixed to the housing. The capacitance module 1106 is displaceable downward. In this example, a pressure input on the top of the capacitance module 1106 may displace the capacitance module 1106, the substrate 1108, and the substrate pressure electrode 1104.

Figure 12:
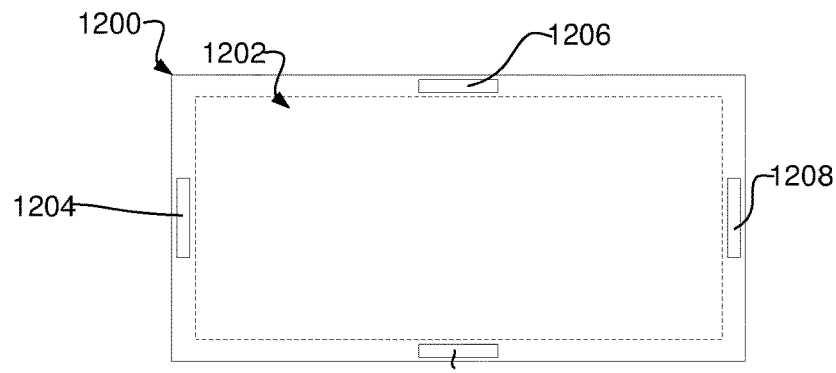
FIG. 12 depicts an example of an arrangement of pressure electrodes in accordance with the disclosure.
Figure 13:
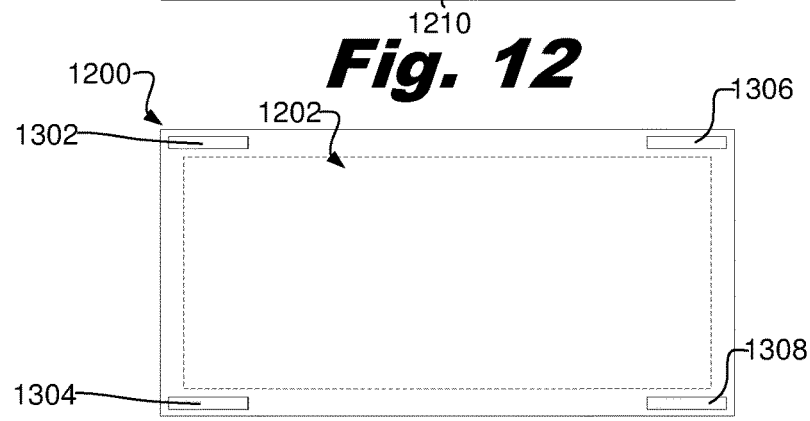
FIG. 13 depicts an example of an arrangement of pressure electrodes in accordance with the disclosure.
Figure 14:
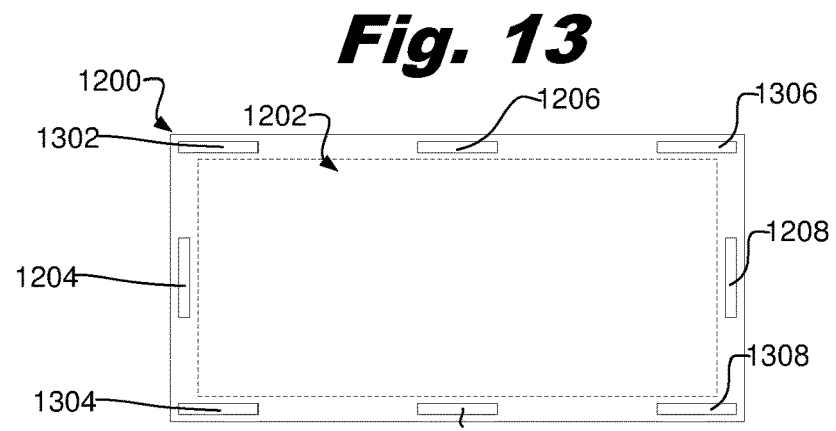
FIG. 14 depicts an example of an arrangement of pressure electrodes in accordance with the disclosure.
Figure 15:
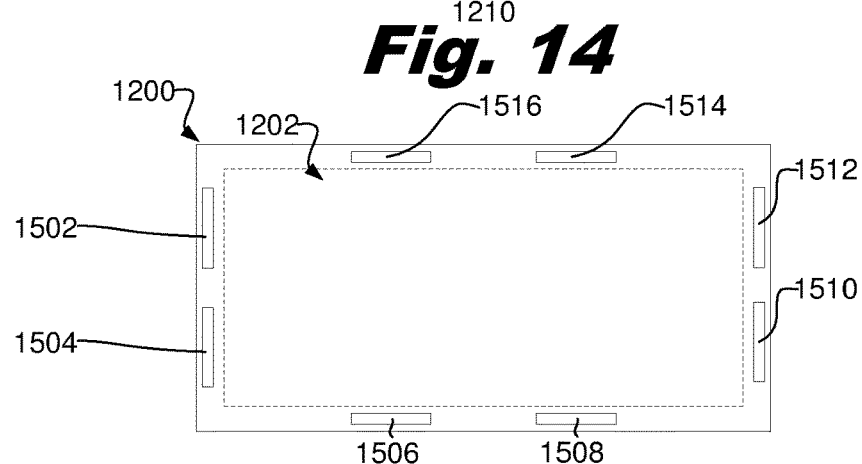
FIG. 15 depicts an example of an arrangement of pressure electrodes in accordance with the disclosure.

FIGS. 12-15 depict examples of substrate pressure electrodes depicted on a substrate 1200 adjacent to a rectangular capacitance module 1202. In the example of FIG. 12, substrate pressure electrodes 1204, 1206, 1208, 1210 are positioned on each of four edges of the substrate 1200. In the example of FIG. 13, substrate pressure electrodes 1302, 1304, 1306, 1308 are positioned in each of the corners of the substrate 1200. In the example of FIG. 14, substrate pressure electrodes 1204, 1206, 1208, 1210 are positioned on each of four edges of the substrate 1200 and substrate pressure electrodes 1302, 1304, 1306, 1308 are positioned in each of the corners of the substrate 1200. In the example of FIG. 15, substrate pressure electrodes 1502 and 1504 are positioned on a first edge of the substrate 1200, substrate pressure electrodes 1506 and 1508 are positioned on a second edge of the substrate 1200, substrate pressure electrodes 1510 and 1512 are positioned on a third edge of the substrate 1200 and substrate pressure electrodes 1514 and 1516 are positioned on a fourth edge of the substrate 1200.

In some examples, reference pressure electrodes may be positioned above the substrate pressure electrodes in FIGS. 12-15. In some examples, there may be one reference pressure electrodes for each substrate pressure electrode. In other examples, the number of substrate pressure electrodes may be different than the number of reference pressure electrodes.

While the examples in FIGS. 12-15 are described with reference to a specific number of substrate pressure electrodes, any appropriate number of substrate pressure electrodes may be disposed adjacent to the capacitance module 1202 on the substrate 1200. For example, the number of substrate pressure electrodes may include one substrate pressure electrodes or multiple substrate pressure electrodes. While the examples depicted above are described with reference to specific patterns and locations for the substrate pressure electrodes, other arrangements are contemplated including, but not limited to, symmetric distribution of electrodes, an asymmetric distribution of electrodes, other distributions and patterns of electrodes, or combinations thereof.

Figure 16:
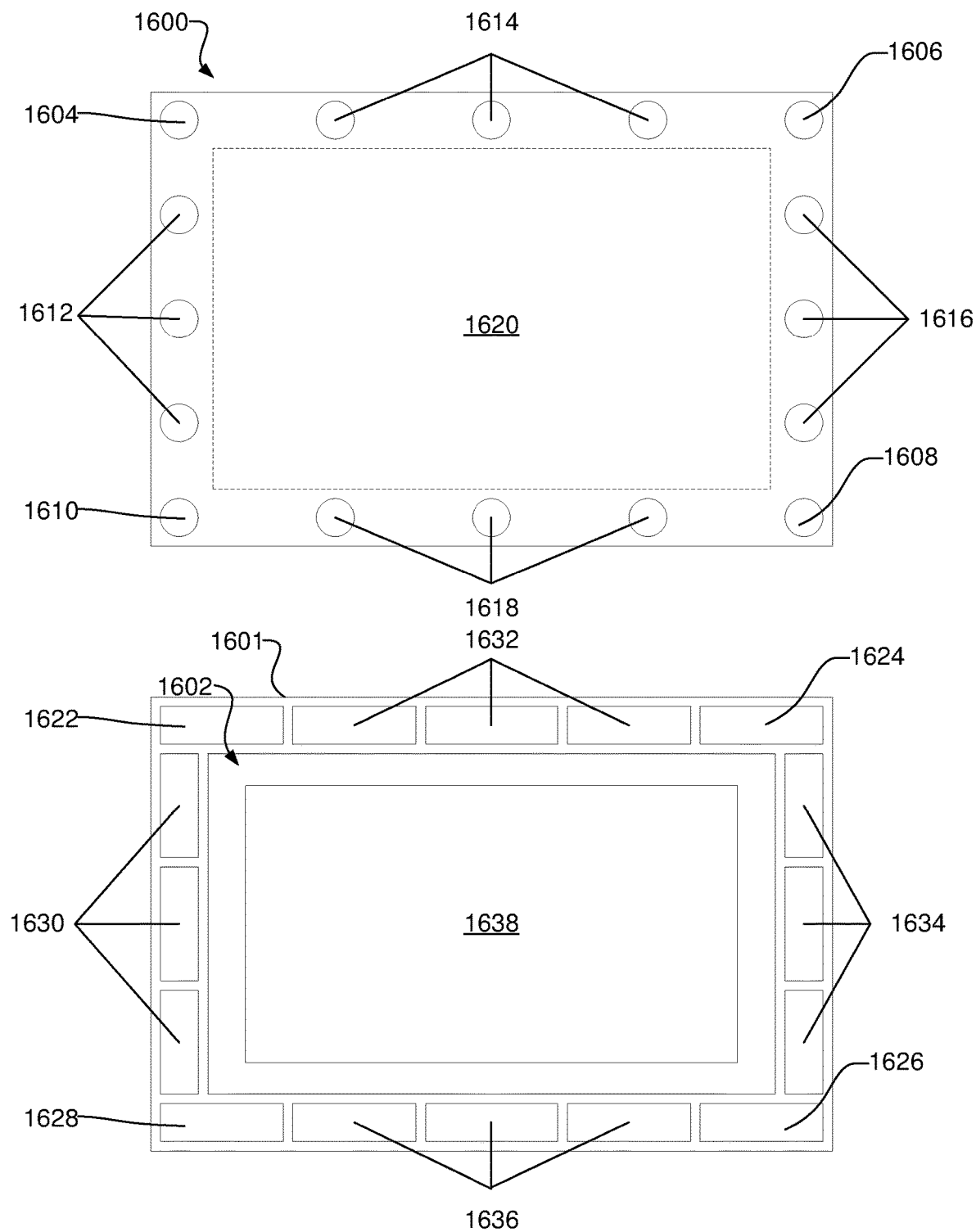
FIG. 16 depicts an example of an arrangement of pressure electrodes in accordance with the disclosure.

FIG. 16 depicts an example of pressure electrodes positioned on a substrate 1600 and a housing 1601. Substrate pressure electrodes 1604, 1606, 1608, 1610 are positioned in each of the four corners of the substrate 1600. Sets of substrate pressure electrodes 1612, 1614, 1616, 1618 are positioned on each of four edges of the substrate 1600. The substrate pressure electrodes may be positioned adjacent to a capacitance module 1620. Reference pressure electrodes 1622, 1624, 1626 1628 are positioned adjacent to each corner of an opening 1602 of the housing 1601. Sets of electrodes 1630, 1632, 1634, 1636 are positioned adjacent to each of four edges of the opening 1602 of the housing 1601. A reference surface 1638 of the capacitance module 1620 is surrounded by the opening 1602.

In this example, the substrate pressure electrodes are circular, and the reference pressure electrodes are rectangular, but the shapes of the pressure electrodes may be any appropriate shape. In some examples, several electrodes may be a different shape than other electrodes. For example, the substrate pressure electrodes on the edges of the substrate may be rectangular and the substrate pressure electrodes in the corners of the substrate may be circular. In some examples, the substrate may be larger than in this example. In such an example, the substrate pressure electrodes may be adjacent to corners and/or edges of the capacitance module 1620. In some examples, the capacitance reference surface 1638 may be larger than the opening. In this case, the reference pressure sensors may be positioned adjacent to corners or edges of the capacitance reference surface 1638.

Figure 17:
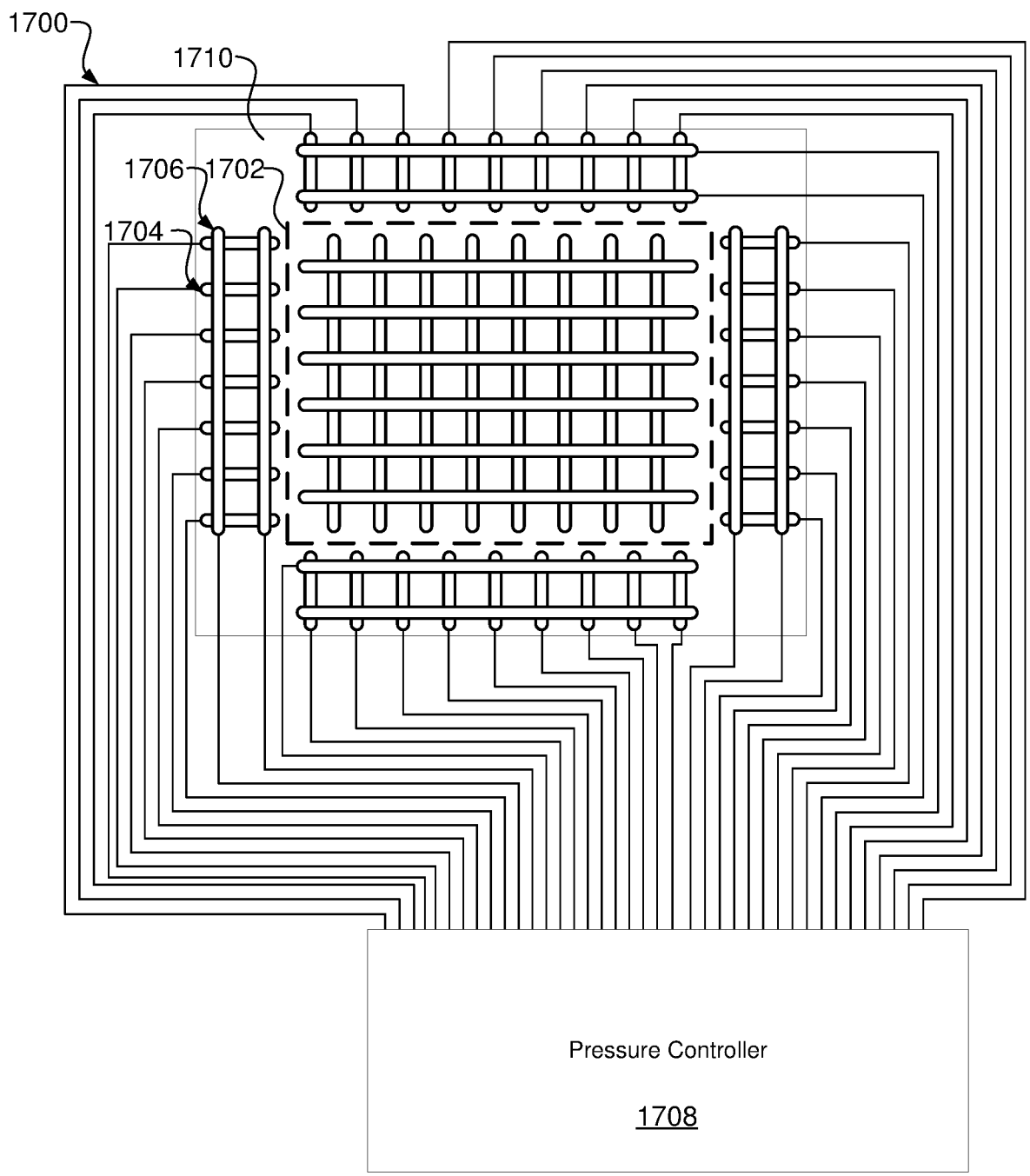
FIG. 17 depicts an example of a capacitance system in accordance with the disclosure.

FIG. 17 depicts an example of a capacitance system 1700. A set of touch sensor electrodes 1702 are positioned in a central part of a substrate 1710. The set of touch electrodes 1702 may be part of a touch sensing circuit as described in FIG. 2. A set of x pressure electrodes 1704 and a set of y pressure electrodes 1706 are positioned in a plurality of edges of the substrate 1710. The sets of pressure electrodes 1704 and 1706 are positioned to be transverse to each other on the substrate 1710 are part of a pressure sensing circuit with a pressure controller 1708.

In this example, the sets of pressure electrodes 1704 and 1706 form a pressure sensing circuit, where the sets of electrodes 1706 are driven and sensed simultaneously. In one example, the capacitance system may part of an electronic device capable of sensing both touch and pressure inputs. In this case, the substrate 1710 may be beneath a touch capacitance reference surface (not shown). A pressure input may cause parts of the pressure sensing circuit to move downward and detect a change in distance between it and an electrically conductive housing of the electronic device adjacent to a plurality of edges of the capacitance reference surface. In this example, an object, such as a finger, may apply a pressure to the capacitance reference surface, which applies a pressure on the substrate 1710. This may cause the substrate 1710 and fixed electrodes to move downward, increasing the distance between the sets of pressure electrodes 1704 and 1706 and the electrically conductive housing.

As the distance between the sets of pressure electrodes 1704 and 1706 and the electrically conductive housing increases, the capacitance between them may decrease. The pressure controller 1708 may determine the magnitude of the pressure input based on the change in the capacitance measured with the pressure electrodes 1704 and 1706. In the depicted example, the sets of pressure electrodes 1704 and 1706 are transverse to each other. In such an example, individual pressure electrodes of the sets of pressure electrodes 1704 and 1706 may be driven and sense capacitance individually. By comparing the change in capacitance of the individual electrodes, the location of the pressure input may be determined.

The pressure controller 1708 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

While in this example, the pressure controller 1708 may part of a self-capacitance pressure sensing circuit, a mutual capacitance pressure sensing circuit, a mixture of the two, or any other configuration with at least one pressure sense electrode incorporated into the capacitance module. In some examples, the pressure controller 1708 may share components with a touch controller. For example, a touch controller and a pressure controller may both use a single processing unit to make calculations or perform operations. In other examples, the touch controller and pressure controller may be separate processing unit. In yet another example, the touch controller, and/or pressure controller may be operated with distributed processing units, cloud-based processing units, or combinations thereof.

Figure 18:
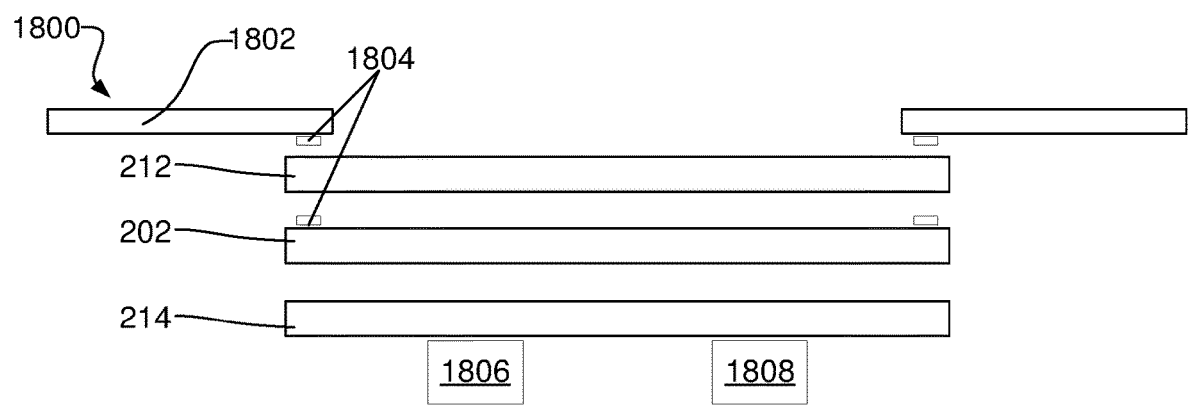
FIG. 18 depicts an example of an arrangement of haptic response actuators in accordance with the disclosure.

FIG. 18 depicts an example of a capacitance system 1800. A housing 1802 includes a first side which may be a working surface and a second side which may be an interior surface. A substrate 202 of a capacitance module may be located between a capacitance reference surface 212 and a shield 214. A pressure sensor 1804 includes a substrate pressure electrode on the substrate and a reference pressure electrode on the second side of the housing. Haptic devices 1806 and 1808 are positioned beneath the shield 214.

In this example, the pressure sensor 1804 may determine the location and magnitude of a pressure input. After the location and/or magnitude of the pressure input is determined, the haptic devices 1806 and 1808 may produce a haptic feedback response due to the location and/or magnitude of the pressure input. In some examples, the haptic feedback response may be produced in the location of the detected location of the pressure input. In other examples, a haptic response may be produced due to the magnitude of the pressure input exceeding a certain threshold value.

While in this example, the haptic devices 1806, 1808 are positioned adjacent the shield 214, the haptic devices may be positioned in any appropriate position that may produce a haptic feedback response on the capacitance reference surface 212. For example, the haptic devices may be positioned adjacent to the capacitance reference surface 212, in between the capacitance reference surface 212 and the substrate 202, in between the substrate 202 and the shield 214, or in multiple of these locations. In this example, there are two haptic devices, but in other examples, there may be one haptic device, multiple haptic devices, different types of haptic devices or any combination that may produce a haptic feedback response.

Figure 19:
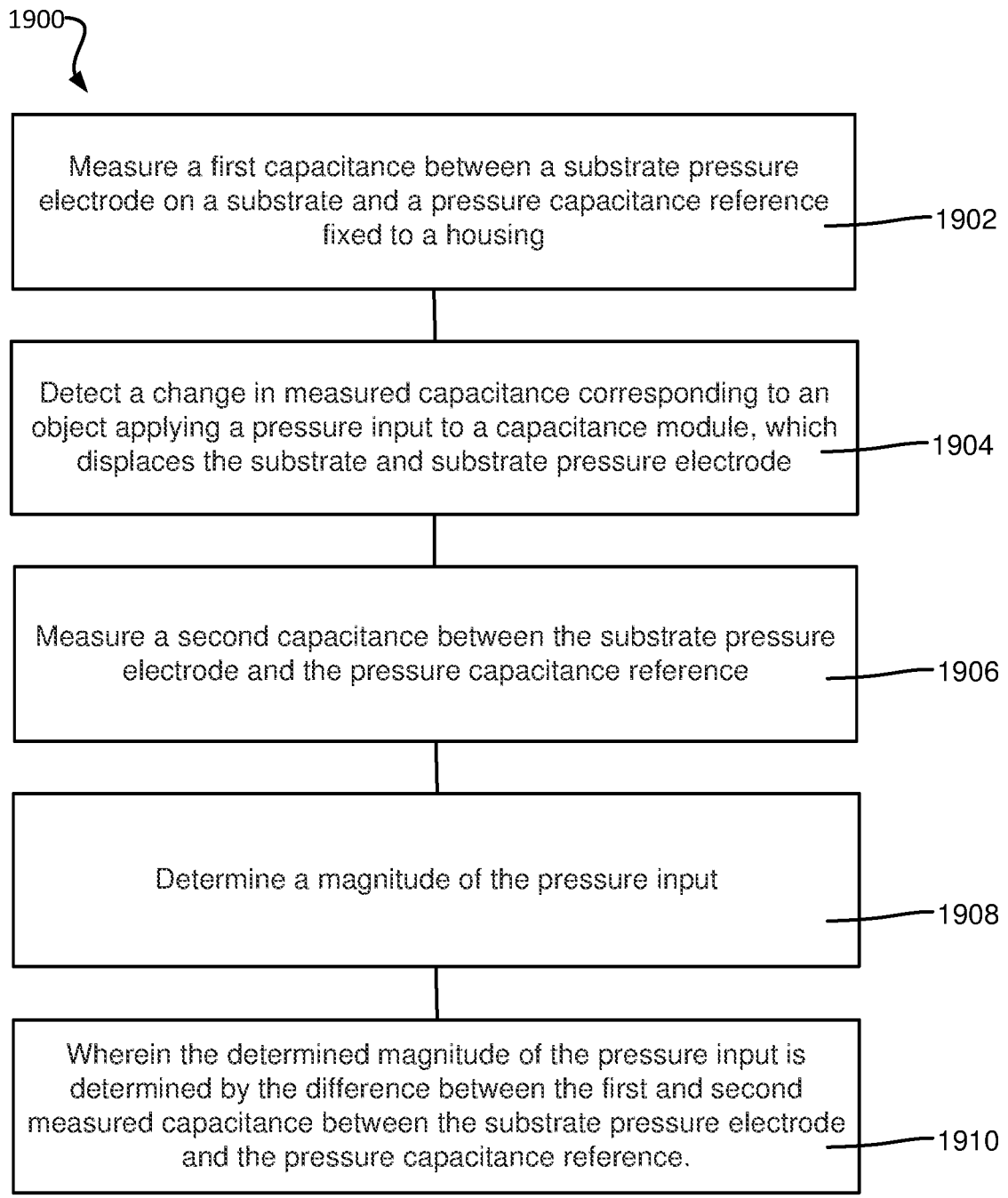
FIG. 19 depicts an example of a method of determining a magnitude of a pressure input in accordance with the disclosure.

FIG. 19 depicts an example of a method 1900 of determining the magnitude of a pressure input. This method 1900 may be performed based on the description of the devices, modules, and principles described in relation to FIGS. 1-18 and 20. In this example, the method 1900 includes measuring 1902 a first capacitance between a substrate pressure electrode on a substrate and a pressure capacitance reference fixed to a housing detecting 1904 a change in measured capacitance corresponding to an object applying a pressure input to a capacitance module, which displaces the substrate and substrate pressure electrode measuring 1906 a second capacitance between the substrate pressure electrode and the pressure capacitance reference and determining 1908 a magnitude of the pressure input, wherein 1910 the determined magnitude of the pressure input is determined by the difference between the first and second measured capacitance between the substrate pressure electrode and the pressure capacitance reference.

Figure 20:
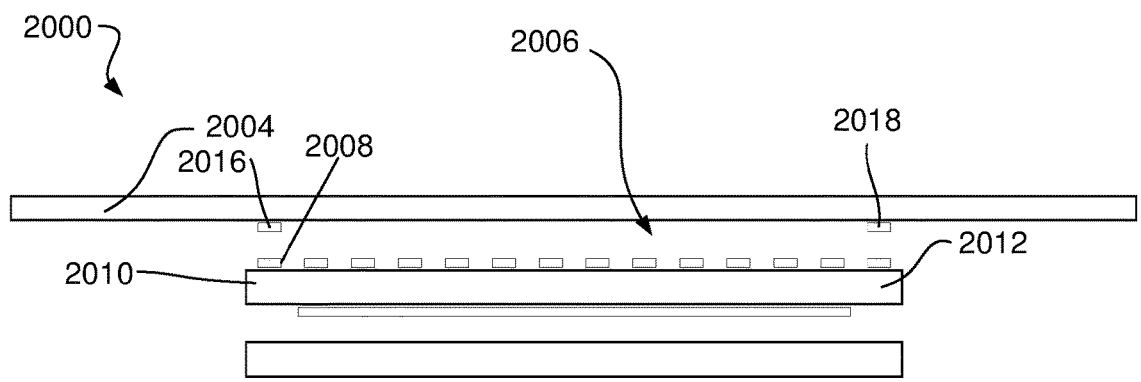
FIG. 20 depicts an example of a capacitance system in accordance with the disclosure.

FIG. 20 depicts an example of a capacitance system 2000. In this example, a capacitance module 2002 is positioned adjacent to a housing 2004 of an electronic device. The housing 2004 may have a continuous surface. In some examples, the continuous surface of the housing 2004 does not provide an access opening where a capacitance module 2002 is visible to a user.

In this example, the capacitance module 2002 may include one or more layers that include at least some touch electrodes 2006 that may be used to determine the location of a user input. In this example, in additional to the touch electrodes, a first substrate pressure electrode 2008 is located in a first region of the substrate 2010 and a second substrate pressure electrode 2012 is located in a second region of the substrate 2010.

A first reference pressure electrode 2014 may be fixed to an interior surface 2016 of the housing 2004 and a second reference pressure electrode 2018 may be fixed to the interior surface 2016. The first reference pressure electrode 2014 may be adjacent to, nearby, aligned with, offset from, at least detectable with the first substrate pressure electrode 2008. The second reference pressure electrode 2018 may be adjacent to, nearby, aligned with, offset from, at least detectable with the second substrate pressure electrode 2012.

In some examples, when a pressure input is applied to the housing 2004, the housing 2004 flexes under the load from the pressure input. The flexure of the housing 2004 under the load may be enough to change the distance between the first reference pressure electrode 2014 and the first substrate pressure electrode 2008 and/or the distance between the second reference pressure electrode 2018 and the second substrate pressure electrode 2012. The changes in capacitance resulting from the change in distance may be used to determine whether there is a pressure input, the amount of pressure associated with a measured input, the location of a pressure input, another characteristic of a pressure input, or combinations thereof.

While the example in FIG. 20 depicts the first and second regions where the first and second substrate pressure sensors are located, the first and second regions may be located in any appropriate location on the substrate. Further, while the example depicted in FIG. 20 depicts just two substrate pressure electrodes, any appropriate number of substrate pressure electrodes may be used. Further, while the example depicted in FIG. 20 depicts just two substrate pressure electrodes, any appropriate number of reference pressure electrodes may be used.

In some examples, the continuous surface of the housing may be a touchscreen surface, a keyboard working, another type of surface, or combinations thereof. In some examples, the continuous surface is made of a plastic, glass, a metal, another type of material, or combinations thereof.

Further, while the example of FIG. 20 is depicted with reference pressure electrodes, in some examples with a continuous housing surface, the electrical properties of the housing may be used as a pressure capacitance reference. For example, the first or second substrate pressure electrodes may be used to measure the distance from the housing. Based on the distance from the housing, the pressure sensing circuitry and/or controller may be used to determine whether there is a pressure input being made, the amount of pressure associated with the pressure input, the location of the pressure input, another characteristic of the pressure input, or combinations thereof.

Figure 21:
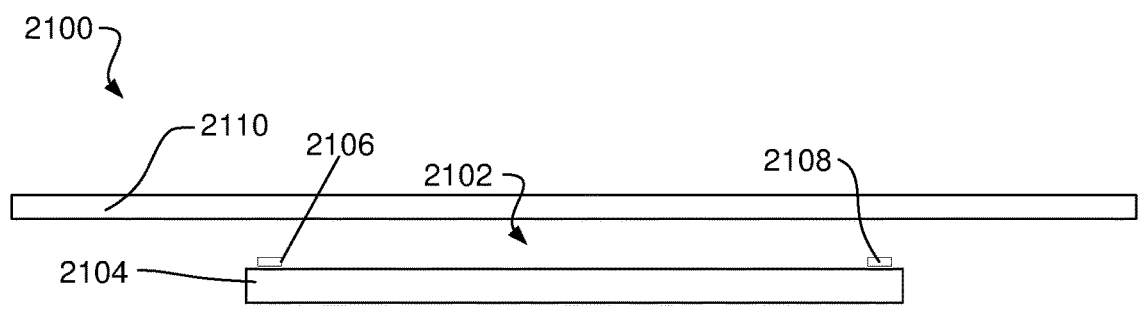
FIG. 21 depicts an example of a capacitance system in accordance with the disclosure.

FIG. 21 depicts an example of a capacitance system 2100. In this example, a capacitance module 2102 includes a substrate 2104, a first pressure electrode 2106 on the substrate 2104, and a second pressure electrode 2108 on the substrate 2104. The housing 2110 may include a continuous working surface and the capacitance module 2102 may be secured adjacent to an interior side of the capacitance module 2102. In this example, the housing 2110 may include an electrical characteristic that allows the housing 2110 to be detected with the first pressure electrode 2106, the second pressure electrode 2108, another pressure electrode, or combinations thereof. As a pressure input is applied to the housing 2110, the housing 2110 may flex changing the relative distance between the housing and at least one of the pressure electrodes 2106, 2108. Based on the change of the relative distances between the housing and the pressure electrodes, a pressure sensing circuit and/or a controller may determine if a pressure input has been made, an amount of pressure of the pressure input, a location of the pressure input, or combinations thereof.

In the depicted example, the just the first pressure electrode 2106 and the second pressure electrode 2108 are depicted. However, in other example, more than two pressure electrodes may be used to measure a change in the distance between the housing and the pressure electrodes. Any number of pressure electrodes may be incorporated into the substrate and/or the capacitance module. Further, while the depicted example shows a first and a second pressure electrode in specific locations on the substrate or in the capacitance module, in other examples, the pressure electrodes may be positioned in other areas. For example, at least one pressure electrode may be located in a central portion of the substrate, an edge portion of the substrate, another portion of the substrate, or combinations thereof.

In some examples, the only components involved with the pressure sensing circuit are location on either surface of the substrate. In other examples, additional components that are part of other circuits may be incorporated into the substrate. For example, components that are part of a light-emitting diode circuit, a haptics circuit, a touch sensing circuit, a proximity sensing circuit, an antenna circuit, a pixel circuit, a wireless circuit, another type of circuit, or combinations thereof may be location on the substrate.

Figure 22:
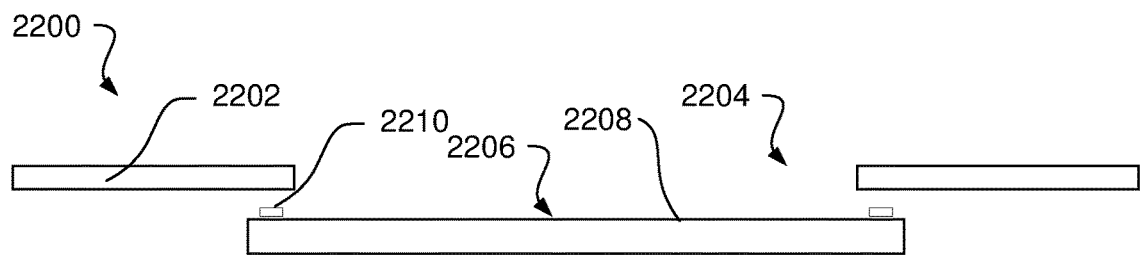
FIG. 22 depicts an example of a capacitance system in accordance with the disclosure.

FIG. 22 depicts an example of a capacitance system 2200. In this example, the housing 2202 defines an opening 2204, and a capacitance module 2206 is accessible from the opening. A user may apply a pressure input directly onto a surface 2208 of the capacitance module 2206. In this example, as the capacitance module 2206 moves in response to the pressure input, the pressure electrodes 2210 incorporated into the capacitance module 2206 may move with the capacitance module 2206. As a result, the distance between at least one pressure electrode 2210 and the housing 2202 may change. The change in distance may be detected with the pressure electrodes 2210. The obtained capacitance measurement representing the change in the distance may be used to determine if a pressure input occurred, the amount of pressure involved in the pressure input, the location of the pressure input, the absolute pressure of the pressure input, the relative pressure of the pressure input, another characteristic of the pressure input, or combinations thereof.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance system integrated into an electronic device, comprising:
   a housing of the electronic device;
   the housing defining a cavity;
   a pressure capacitance reference fixed to the housing;
   a capacitance module disposed within the cavity;
   at least one touch electrode on a printed circuit board of the capacitance module;
   a substrate pressure electrode also on the printed circuit board of the capacitance module;
   wherein the pressure capacitance reference is detectable with the substrate pressure electrode of the capacitance module.

2. The capacitance system of claim 1, wherein the substrate pressure electrode is a part of a dedicated pressure sensing circuit.

3. The capacitance system of claim 1, wherein the touch electrode is a part of a dedicated touch sensing circuit.

4. The capacitance system of claim 1, wherein the pressure capacitance reference includes at least one reference pressure electrode.

5. The capacitance system of claim 4, wherein the reference pressure electrode of the pressure capacitance reference is a transmit electrode, and the substrate pressure electrode on the printed circuit board is a sense electrode.

6. The capacitance system of claim 4, wherein the reference pressure electrode of the pressure capacitance reference is a sense electrode, and the substrate pressure electrode on the printed circuit board is a transmit electrode.

7. The capacitance system of claim 4, wherein the reference capacitance electrode of the pressure capacitance reference is disposed within a thickness of the housing.

8. The capacitance system of claim 1, wherein the substrate pressure electrode on the printed circuit board is a self-capacitance electrode.

9. The capacitance system of claim 1, wherein the pressure capacitance reference includes an electrical property of a material of the housing.

10. The capacitance system of claim 1, wherein the substrate pressure electrode on the printed circuit board is located in a corner of the printed circuit board.

11. The capacitance system of claim 1, wherein the substrate pressure electrode is part of a group of substrate pressure electrodes;
the printed circuit board has a plurality of corners; and
at least one of the electrodes from the group of electrodes is located in each of the corners of the printed circuit board.

12. The capacitance system of claim 1, wherein the substrate pressure electrode on the printed circuit board is aligned with the pressure capacitance reference.

13. The capacitance system of claim 1, wherein the pressure is determined, at least in part, by the difference between the capacitance measured between the substrate pressure electrode and the pressure capacitance reference.

14. The capacitance system of claim 1, wherein the substrate pressure electrode on the printed circuit board is not aligned with the pressure capacitance reference.

15. The capacitance system of claim 1, wherein the substrate pressure electrode is selectively part of a touch sensor circuit and at least one touch electrode is selectively part of a pressure sensor circuit.

16. The capacitance system of claim 1, wherein the substrate pressure electrode on the printed circuit board is displaceable with respect to the pressure capacitance reference when a pressure is applied to the capacitance module.

17. The capacitance system of claim 1, wherein an overlay covers the capacitance module.

18. A method for detecting a pressure input, comprising:
   measuring a first capacitance between a substrate pressure electrode on a printed circuit board and a pressure capacitance reference fixed to a housing;
   detecting a change in measured capacitance corresponding to an object applying a pressure input to a capacitance module, which displaces the printed circuit board and substrate pressure electrode;
   measuring a second capacitance between the substrate pressure electrode and the pressure capacitance reference; and
   determining an amount of the pressure input;
   wherein the determined amount of the pressure input is determined by a difference between the first and second measured capacitance between the substrate pressure electrode and the pressure capacitance reference.

19. The method of claim 18, wherein the substrate pressure electrode is part of a group of substrate pressure electrodes on the printed circuit board;
   each substrate pressure electrode of the group is located in different parts of the printed circuit board; and
   a location of a pressure input is determined, at least in part, by the difference between the capacitance measured between the pressure capacitance reference and each of the group of substrate pressure electrodes.

20. A capacitance system integrated into an electronic device, comprising:
   a housing of the electronic device;
   the housing defining a cavity;
   a capacitance module disposed within the cavity;
   a pressure electrode incorporated into the capacitance module;
   wherein the housing is detectable with the pressure electrode of the capacitance module;
   memory and a processor in communication with the memory; and
   the memory containing programed instructions that, when executed, causes the processor to:
      with the pressure electrode, measure a distance between the housing and the pressure electrode; and
      detect a pressure input based, at least in part, on the measured distance.

* * * * *